E. D. PUTT.
BEAD TRIMMING MACHINE.
APPLICATION FILED MAY 21, 1918.
1,325,578.
Patented Dec. 23, 1919.
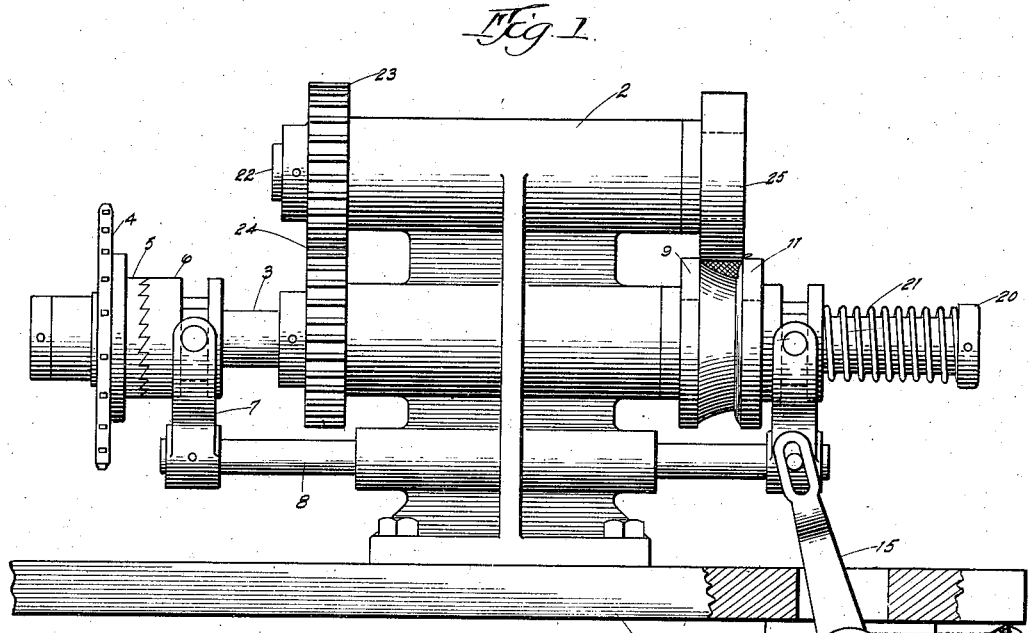
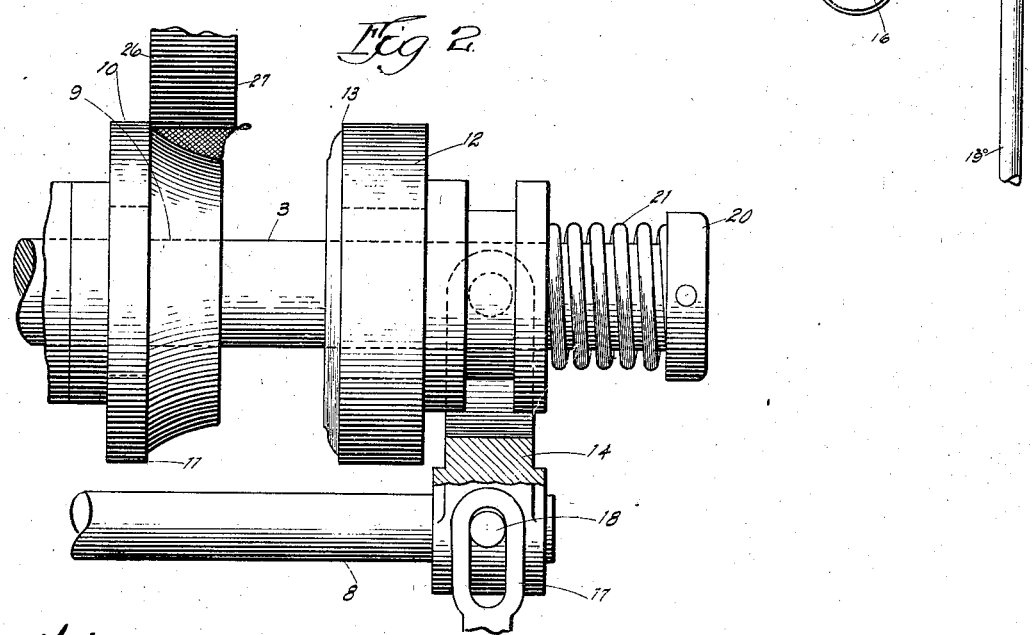
Witness:
Geo. C. Davison
Inventor
Edward D. Putt,
By G. L. Ely, Atty.

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

BEAD-TRIMMING MACHINE.

1,325,578.     Specification of Letters Patent.     Patented Dec. 23, 1919.

Application filed May 21, 1918. Serial No. 235,852.

*To all whom it may concern:*

Be it known that I, EDWARD D. PUTT, a citizen of the United States, residing at Akron, in the county of Summit, State of Ohio, have invented certain new and useful Improvements in Bead-Trimming Machines, of which the following is a specification.

Beads required for use in the manufacture of automobile tire casings are covered with fabric and before being incorporated in the casing, are semi-cured in circular form in a mold which causes a rind of rubber and fabric to be formed on the two edges of the bead where the mold separates. These rinds have to be trimmed off before the bead can be incorporated in the tire, which work was formerly done by hand, but the machine I have devised is designed to do the work better and more rapidly than it could be done by hand. As the beads are circular in form, it is necessary to have the cutting mechanism open up to admit and discharge the beads and the machine devised by me opens up quickly and closes together without danger of injuring the knives and automatically seats the bead accurately in the cutting mechanism.

One embodiment of my invention is shown in the drawings accompanying this specification, but it is obvious that details may be varied without departing from the invention or sacrificing any of its benefits.

Figure 1 is a side elevation of the machine showing a bead in position to be trimmed.

Fig. 2 is an enlarged view showing the cutting mechanism open to receive the bead.

The machine is mounted on a table 1 and comprises a standard 2 which is bored out to receive the several operating shafts. The main operating shaft is shown at 3, and is driven through the medium of a sprocket wheel 4 having a clutch surface 5 on its inside face. The wheel 4 is loose on the shaft, but arranged to operate it through a sliding clutch member 6, the parts 5 and 6 having preferably shallow clutch faces so that the shaft will not be started in rotation until the parts are in the proper position.

The clutch is arranged to be shifted by a spanner member 7 carried on a shift rod 8 slidably mounted in the lower part of the standard.

On the end of shaft 3 opposite to the clutch members is secured one of the members of the bead supporting and trimming mechanism. This member is indicated by the numeral 9 and comprises a cylindrical edge member 10 having a knife edge 11 adjacent to which is a tapering supporting surface adapted to receive the bead and shaped to conform to one side of it. Located outwardly of the roller 9, is a second roller 12, the inner face of which is tapered to fit a second side of the bead, the upper edge 13 being a cutting edge. The roller 12 is arranged to be moved away from the roller 9 by a spanner 14 secured to the rod 8. The slide rod is moved to the right of Fig. 1 by a bell crank lever 15, pivoted at 16 on the table, one end being slotted as at 17 to pass over pin 18 on the spanner, the other end being connected to a rod 19 which is in turn connected to a foot treadle (not shown). On the end of the shaft 4 is secured a collar 20 between which and the roller 12 is a coil spring 21, the purpose of which is to hold the rollers 9 and 12 tightly together in order to position the bead accurately, and hold the knives in cutting relation.

Above the shaft 3 in the standard is mounted a counter shaft 22, carrying a gear 23 in mesh with gear 24 on the shaft 3. The end of the shaft over the roller 9 carries a cylindrical roller 25, the periphery of which is shaped to correspond with the remaining surface of the bead and the edges 26 and 27 which are sharpened to coöperate with the knife edges 11 and 13.

When a bead is to be trimmed the bell crank lever 15 is rocked to open the trimming knives as shown in Fig. 2 and the circular bead is dropped into its place resting in the lower roller 11, with the two edges on which the rind occurs on top of the bead. The roller 12 is now released and the spring 21 forces it over against the roller 9 accurately positioning the bead and placing the rind between the cutting edges 11 and 26 and 13 and 27.

It will be noted that the faces of the rollers overlap slightly whereby the edges of the bead are accurately trimmed and the knives can not injure one another.

It is obvious that changes and modifications may be made in the scope of the attached claims without departing from the spirit of the invention or sacrificing any of its benefits. It is also obvious that the invention is not limited to the particular use shown herein but may be of general application by means of changes within mechanical skill, and while it is shown in use on clencher beads, by suitable redesigning of the rolls it can be made for any other type of bead.

I claim:

1. In a machine for trimming beads the combination of three rollers shaped to conform to the sides of the bead, the rollers being provided with cutting edges at their lines of contact and means to move one of said rollers laterally to admit the bead.

2. In a machine for trimming beads, the combination of a roller having a surface conforming to one side of the bead and a cutting edge at the limit of said surface, a second roller having a surface conforming to a second side of the bead, and a cutting edge at the limit of said surface, means to move one of said rollers laterally to admit the bead and a third roller having cutting edges coöperating with the aforementioned cutting edges and conforming to the third side of the bead.

3. In a machine for trimming beads, the combination of two rollers contacting two sides of the bead and having cutting edges, a third roller contacting the remaining side of the bead and having cutting edges coöperating with the first named cutting edges, the cutting edges overlapping, and means to move one of the first mentioned rollers laterally to admit the bead.

4. In a machine for trimming beads, the combination of two rollers having surfaces conforming to two surfaces of the bead, and having cutting edges at the limits of the surfaces, a third roller located between the first two rollers and having cutting edges overlapping the first named cutting edges, and means to move one of said rollers laterally to admit the bead.

5. In a machine for trimming material, the combination of three rollers having cutting edges in overlapping relation and surfaces conforming to the material to be trimmed, one of said rollers being located between the other two, and means for moving one of the outside rollers laterally to admit the material, and means to force the rollers together to seat it in position surrounded by the rollers.

EDWARD D. PUTT.